United States Patent [19]

Nicholson

[11] Patent Number: 4,875,504

[45] Date of Patent: Oct. 24, 1989

[54] RECREATIONAL VEHICLE GATE VALVE ACTUATOR

[76] Inventor: Walter P. Nicholson, 1543 Hayden View Dr., Coeur D'Alene, Id. 83814

[21] Appl. No.: 282,433

[22] Filed: Dec. 8, 1988

[51] Int. Cl.⁴ ............................................. A01G 25/09
[52] U.S. Cl. ................................ 137/899; 251/129.12; 251/291
[58] Field of Search .............. 251/291, 129.11, 129.12; 137/899

[56] References Cited

U.S. PATENT DOCUMENTS

| | | | |
|---|---|---|---|
| 916,831 | 3/1909 | Bettinger | 251/129.12 |
| 2,912,087 | 11/1959 | Kron et al. | 251/129.12 |
| 3,334,859 | 8/1967 | Raymond, Jr. | 251/129.12 |
| 3,472,269 | 10/1969 | Scholle | 251/291 |
| 3,941,349 | 3/1976 | Pierson | 251/100 |
| 4,000,663 | 1/1977 | Tyler | 251/129.12 |
| 4,231,389 | 11/1980 | Still et al. | 251/291 |
| 4,310,144 | 1/1982 | Nogaki | 192/143 |
| 4,463,930 | 8/1984 | Vamvakas | 251/326 |
| 4,550,453 | 11/1985 | Norman | 4/323 |
| 4,624,280 | 11/1986 | De Pirro | 251/129.12 |

Primary Examiner—A. Michael Chambers
Attorney, Agent, or Firm—Seed and Berry

[57] ABSTRACT

A gate valve actuator which can be quickly and easily refitted to manually operable holding tank gate valves on recreational vehicles to convert to remote operation. The actuator includes a housing with clamping flanges and a clamping plate which are used to clamp the actuator housing to the slide gate housing. A traveler block having a fork to engage and move the valve handle is threadably connected to a threaded drive shaft which is selectively rotated by an electric motor to move the valve handle between its open and closed positions. Limit switches terminate power to the motor when the fully open or closed positions are reached. The actuator can be easily removed to again permit manual operation.

6 Claims, 2 Drawing Sheets

U.S. Patent   Oct. 24, 1989   Sheet 1 of 2   4,875,504
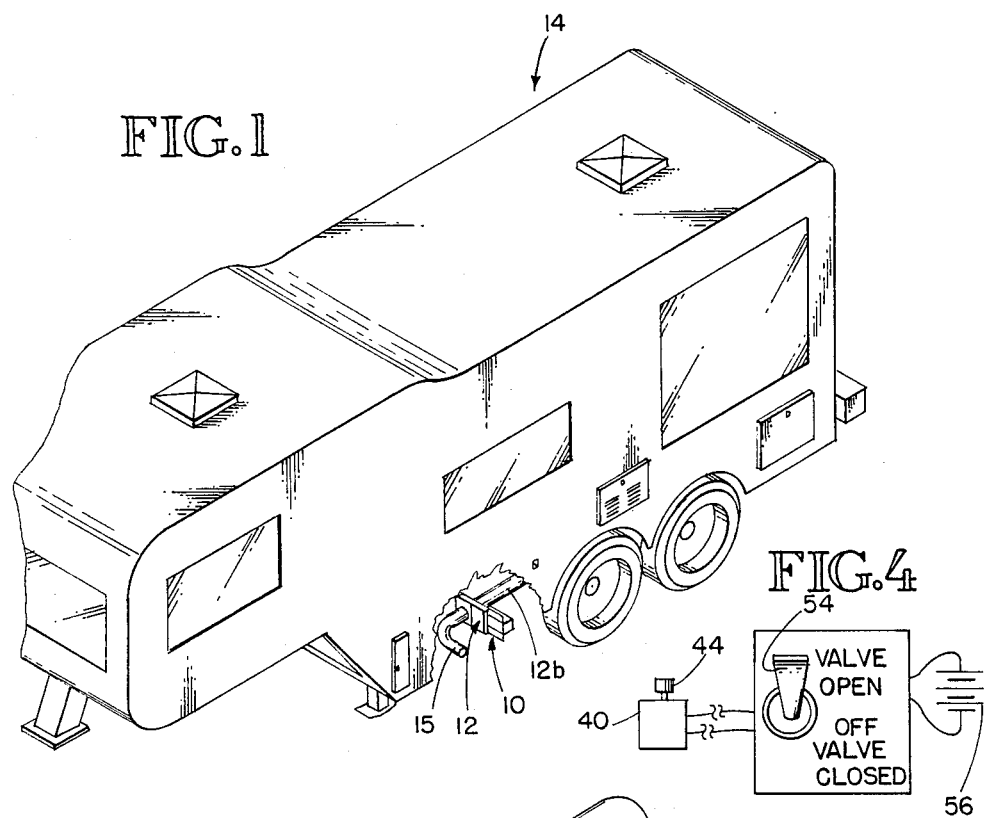
FIG.1
FIG.4
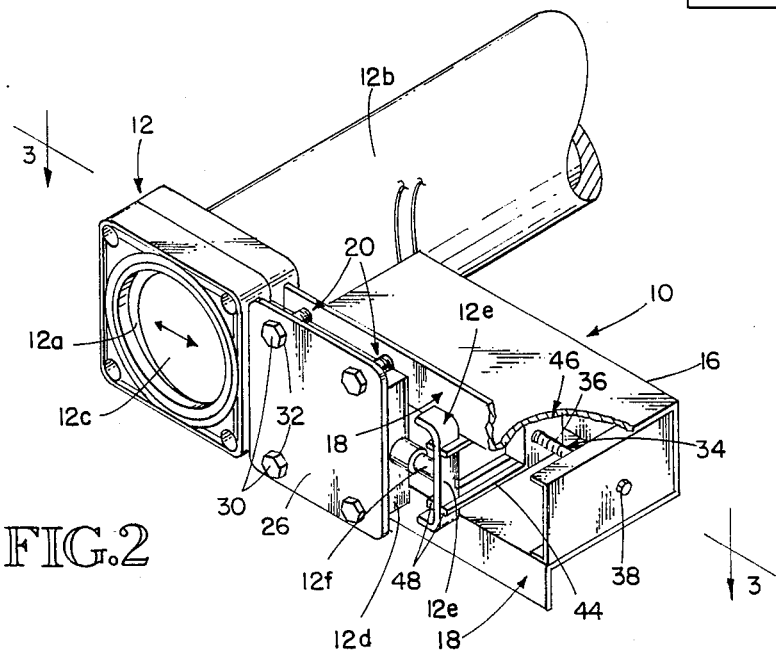
FIG.2

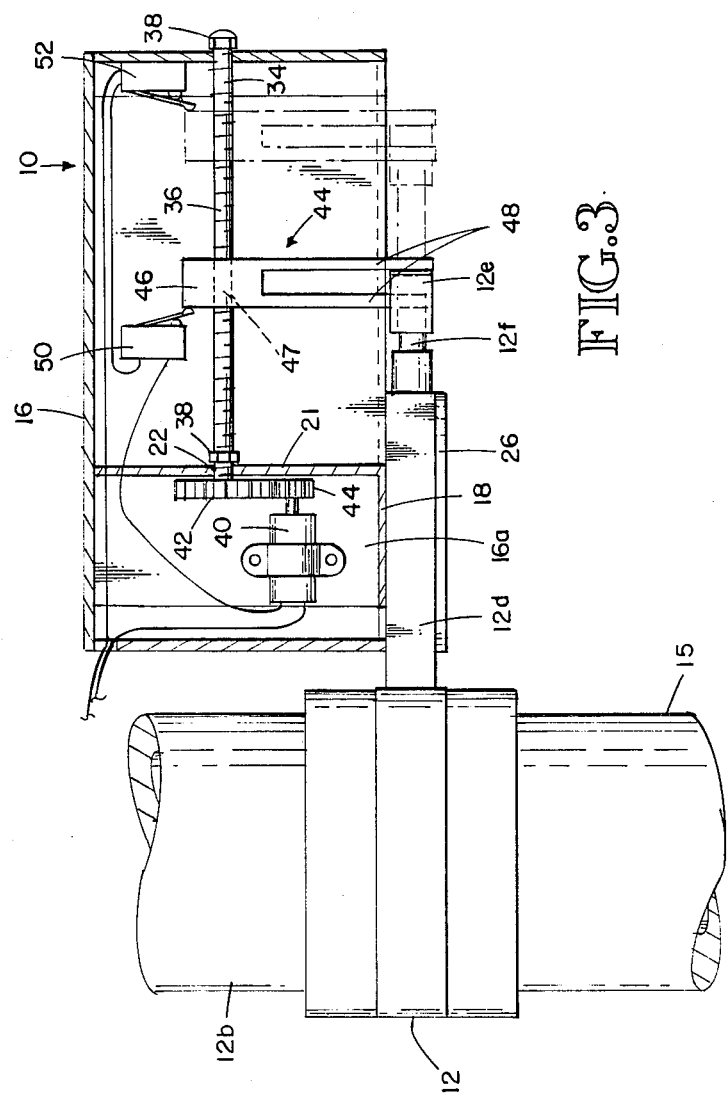

RECREATIONAL VEHICLE GATE VALVE ACTUATOR

DESCRIPTION

Technical Field

This invention relates to valve actuators, and more particularly, to remotely operated and retrofittable actuators for use on holding tank gate valves installed on recreational vehicles.

Background Art

Holding tanks on many recreational vehicles are drained by manually operated gate valves. These gate valves are typically located under the recreational vehicle in hard to reach places. The operation of these valves is difficult for users whose mobility is limited, and inconvenient for anyone wishing to avoid working underneath a large vehicle. Furthermore, because the draining and flushing process of the recreational vehicle holding tanks may require the valve to be opened and closed several times in one complete draining, and this draining may need to occur at night or in inclement weather, a manually operated valve can be undesirable for many people to use.

Electromechanically actuated gate valves are available as original equipment on some recreational vehicles, but these valves are unsuitable for use as retrofit equipment on existing manually operated valves.

DISCLOSURE OF THE INVENTION

The present invention is an electromechanical actuator for the remote operation of a manually operable tank drain valve installed on a recreational vehicle, with the drain valve having a linearly sliding gate with an open and a closed position at the extremes of its travel and a manually operable valve handle attached thereto which slides in a linear, bidirectional manner to move the sliding gate between its open and closed positions. The actuator includes a housing, a drive means for providing controlled, bidirectional linear motion, a control means for controlling the function of the drive means and for providing power thereto, an attachment means for removably securing the housing to the drain valve, and an actuator fork to engage the valve handle.

More specifically, in the presently preferred embodiment of the invention, the housing includes clamping surfaces and the attachment means includes a clamping plate and selectively adjustable fasteners. The clamping surfaces and the clamping plate are sized and arranged to be positioned on opposite sides of the sliding gate housing portion and detachably secured thereto by the fasteners.

In addition, the actuator fork has a base mechanically engaged to the drive means and a plurality of prongs attached to the base and configured to receive the valve handle thereamong and communicate motion of the drive means to the valve handle in response to rotation of the drive shaft, with the prongs being selectively detachable from the valve handle to allow manual operation when desired.

Other features and advantages of the invention will become apparent from the following detailed description, taken in conjunction with the accompanying drawings.

BRIEF DESCRIPTION OF THE DRAWINGS

FIG. 1 is an isometric view of a recreational vehicle with a gate valve actuator according to the present invention retrofitted on one of the drain gate valves.

FIG. 2 is an enlarged, fragmentary isometric view of the gate valve actuator of FIG. 1.

FIG. 3 is an enlarged, fragmentary sectional view of the valve actuator shown in FIG. 2, taken generally along the line 3—3 of FIG. 2.

FIG. 4 is a frontal view of the remote control switch used to control electrical power to the valve actuator of FIG. 1.

BEST MODE FOR CARRYING OUT THE INVENTION

As shown in the drawings, the invention is embodied in a valve actuator 10. The valve actuator 10 is installed as a retrofit product on a drain valve 12 of a recreational vehicle 14. The drain valve 12 has a flow passage 12a which is connected to the drain pipe 12b of a holding tank (not shown) of the recreational vehicle. In FIGS. 1 and 3 the drain valve 12 is shown connected to an external drain pipe section 15 which can be connected to a subterranean storage drain tank (not shown) for drainage of the holding tank. The holding tank may be for the shower/sink drain water or for the toilet water.

The flow passage 12a is selectively opened and closed, completely or partially, as desired, by a slide gate 12c which is slidable between a position in the flow passage and a retracted position in a slide gate housing 12d using a manually operable valve handle 12e. The valve handle 12e is attached to one end of a valve shaft 12f which is attached by its other end to the slide gate 12c.

As best shown in FIG. 2, the valve actuator includes a housing 16 having a pair of coplanar, spaced-apart clamping flanges 18, each with a plurality of threaded fastener holes 20. The clampng flanges 18 have sufficient length to accommodated all known existing drain valve designs.

Attachment of the valve actuator 10 to the drain valve 12 is achieved by positioning clamping flanges 18 against one side of a slide gate housing 12d of the valve 12, positioning a clamping plate 26 against an opposite side of the slide gate housing, and fixedly compressing the sliding gate housing between the clamping flanges 18 and the clamping plate 26 by tightening a plurality of fasteners 30. The clamping plate 26 is a flat, rigid plate having a plurality of fastener holes 32. The fasteners 30 are freely received in the fastener holes 32 and extend through and are threadably received in the threaded fastener holes 20 of the clamping flanges 18.

As best shown in FIG. 3, the valve actuator 10 has a drive shaft 34 positioned within the housing 16. The drive shaft 34 has a threaded drive shaft portion 36 restrained against axial movement at both ends by bearings 38, which permit the drive shaft 34 to rotate freely with respect to the housing 16 but prevent axial travel of the shaft. The drive shaft 34 passes through a clearance hole 22 in an interior wall 21 of the housing 16 and projects into a housing compartment 16a in which a reversible D.C. electric motor 40 is located. A drive gear 42 is fixedly attached to an end of the drive shaft within the housing compartment 16a for selective rotation of the drive shaft in both rotational directions. The motor 40 is fixed to the housing 16 and has a pinion gear 44 mechanically engaging the drive gear 42 of the drive shaft 34 to provide selective clockwise or counterclockwise rotation of the drive shaft.

The actuator 10 includes a fork 44 with a traveler block 46 and four grasping prongs 48 projecting from the traveler block. The traveler block 46 has a threaded aperture 47 which threadably receives the threaded drive shaft portion 36 for axial travel therealong as the drive shaft 34 rotates. The grasping prongs 48 are configured in two pairs, with one pair positioned on each side of the valve handle 12e, to receive the valve handle 12e therebetween. The grasping prongs 48 are positioned so that a first pair of prongs is used to pull the valve handle 12e to an open position in which the slide gate 12c of the drain valve 12 leaves the flow passage 12a open, and a second pair is used to push the valve handle to a closed position in which the slide gate closes the flow passage. Each pair of grasping prongs 48 has one prong located to each side of valve shaft 12f so as to prevent the valve shaft from binding due to eccentric loading as the valve actuator 10 moves the valve handle 12e between the open and closed positions.

The actuator fork 44 provides a sure method of mechanically grasping the valve handle 12e without requiring modification of the valve handle, and the ability to quickly and easily connect and disconnect the valve actuator 10 to and from the valve handle. The present invention is designed for retrofit to existing drain valves 12 without requiring modification of the drain valves and for easy and quick connection to the drain valve with hand tools readily available to the recreational vehicle owner. Installation is accomplished by simply positioning the actuator housing 16 with the clamping flanges 18 to one side of the valve slide gate housing 12d, with the valve handle 12e slipped in between the pairs of grasping prongs 48 of the actuator fork 44. The clamping plate 26 is then placed on the opposite side of the slide gate housing 12d and the fasteners are inserted through the fastener holes 32 in the clamping plate and threaded into the threaded fastener holes 20 of the housing clamping flanges 18 and tightened. As such, a simple and fast mechanical attachment of the valve actuator 10 can be achieved.

The end limits of axial travel of the valve actuator 10 are set to correspond to the end limits of travel of the valve handle 12e between the open and closed position simply by moving the housing 16 relative to the drain valve 12 before clamping the housing thereto. If further adjustment of one or both end limits is needed, one or both of a pair of limit switches 50 and 52 can be adjustably moved relative to the housing, as needed. The limit switches 50 and 52 will be described in more detail below. Not only does this provide for quick and easy attachment of the valve actuator 10, should it ever by necessary to return to manual operation, such as should an electrical power problem occur, or the valve actuation otherwise fails, the valve actuator can be easily and quickly disconnected simply by loosening of the fasteners 30 and pulling the actuator fork 44 away from the valve handle 12e so that the handle can be manually operated once again.

The two limit switches 50 and 52 are fixed to the housing 16 so that the first limit switch 50 is contacted and actuated by the actuator fork traveler block 46 when the traveler block reaches the maximum desired excursion position in one axial direction with the valve handle 12e in the closed position and the drain valve 12 closed, and the second limit switch 52 is contacted and actuated by the actuator fork traveler block 46 when the traveler block reaches the maximum desired excursion position in the opposite axial direction with the valve handle in the closed position and the drain valve open, as best shown in FIG. 3. When actuated, the limit switches 50 and 52 remove elective power from the motor 40 and rotation of the drive shaft 34 is terminated.

A remotely operated switch 54, shown in FIG. 4, is electrically connected to provide D.C. electric power from a battery 56 to the motor 40 and to select the polarity of the voltage applied to the motor so as to control the direction of rotational drive applied to the drive shaft 34. The switch 54 is a double pole, double throw switch with a valve open position to supply voltage with one polarity to the motor 40, a valve closed position to supply voltage with a reversed polarity to the motor and an off position which supplies no voltage to the motor. By selectively applying electric power to the motor 46, the valve actuator 10 moves the drain valve 12 between "valve open" and "valve closed" positions, and "stop" positions therebetween. It is noted that when electric power is removed from the motor 40, the gearing used will prevent further movement of the valve handle 12e and hence the valve slide gate 12 to hold the drain valve 12 in the desired fully or partially open or closed position without the need to continue supplying electric power to the valve actuator 10 which could undesirably drain battery power, such as when it is desired to park the recreational vehicle 14 at a site connected to a storage drain tank for a prolonged period of time.

I claim:

1. A retrofit electromechanical valve actuator for the remote operation of a manually operable tank drain valve installed on a recreational vehicle, the drain valve having a linearly sliding gate with an open and a closed position at the extremes of its travel and a manually operable valve handle attached thereto which slides in a linear, bidirectional manner to move the sliding gate between its open and closed positions, the actuator comprising:

a housing;

attachment means for removably securing the housing to the drain valve;

a drive shaft rotatably supported by the housing and having a threaded drive shaft portion;

a reversible electric drive motor selectively powered to produce clockwise or counterclockwise rotational drive, and unpowered to place it in a stationary, disabled state, the motor being mechanically engaged with the drive shaft to impart rotational drive thereto and supported by the housing;

an actuator fork having a threaded base threadably received on the threaded drive shaft portion and bidirectionally and linearly movable along the drive shaft in response to rotation thereof, and a plurality of prongs attached to the base and configured to receive the valve handle thereamong and communicate the bidirectional linear motion of the traveling base to the valve handle in response to rotation of the drive shaft, the prongs being selectively detachable from the valve handle;

limit switch means for detecting movement of the threaded base to one of a pair of maximum desired excursion positions of a desired range of travel, the maximum excursion positions corresponding to the open and closed positions of the drain valve, and further for disabling the drive motor upon the threaded base's reaching one of the maximum excursion positions to prevent movement of the actuator fork beyond the desired range; and a control switch positionable remote from the drain valve for connecting and disconnecting electrical energy to the drive motor with the desired polarity to selectively cause the drive motor to produce clockwise or counterclockwise rotational drive.

2. The retrofit actuator of claim 1 for use with a drain valve having a sliding gate housing portion wherein the housing includes clamping surfaces and the attachment means includes a clamping plate and selectively tightenable fasteners, the clamping surfaces and the clamping plate being sized and arranged to be positioned on opposite sides of the sliding gate housing portion and detachably clamped thereto by the fasteners.

3. The retrofit actuator of claim 1 wherein the limit switch means includes a first limit switch which is actuated upon the threaded base's reaching the maximum excursion position corresponding to the open position of the drain valve and a second limit switch which is actuated upon the threaded base's reaching the maximum excursion position corresponding to the closed position of the drain valve, the first and second limit switches disconnecting electrical energy from the drive motor upon their actuation to disable the drive motor, and wherein the control switch, drive motor, and first and second limit switches are electrically connected so that positioning of the control switch in a valve-open state causes the drive motor to produce rotational drive to rotate the drive shaft until the first limit switch is actuated by the threaded base, thereby disabling the drive motor, and so that positioning of the switch in a valve-closed state causes the drive motor to produce opposite rotational drive to rotate the drive shaft until the second limit switch is actuated by the threaded base, thereby disabling the drive motor, and positioning of the switch in a stop state disconnects electrical energy from the drive motor and disables the drive motor so that no rotational drive is produced.

4. A retrofit electromechanical valve actuator for the remote operation of a manually operable tank drain valve installed on a recreational vehicle, the drain valve having a linearly sliding gate with an open and a closed position at the extremes of its travel and a manually operable valve handle attached thereto which slides in a linear, bidirectional manner to move the sliding gate between its open and closed positions, the drain valve having a sliding gate housing portion, the actuator comprising:

a housing having clamping surfaces;

drive means for providing controlled, bidirectional linear motion, the drive means being contained in the housing;

control means for controlling the function of the drive means by selectively providing power thereto;

attachment means for removably securing the housing to the drain valve, the attachment means including a clamping plate and selectively adjustable fasteners, the clamping surfaces and the clamping plate being sized and arranged to be positioned on opposite sides of the sliding gate housing portion and detachably secured thereto by the selected adjustment of the fasteners to clamp and unclamp the sliding gate housing portion between the housing clamping surfaces and the clamping plate; and an actuator fork having a base mechanically engaged with the drive means and a plurality of prongs attached to the base and configured to receive the valve handle therebetween and to communicate the motion of the drive means to the valve handle, the prongs being selectively detachable from the valve handle.

5. The retrofit actuator of claim 4 wherein the housing clamping surfaces are a pair of spaced-apart flanges with coplanar flange clamping surfaces.

6. The retrofit actuator of claim 5 wherein the flange clamping surfaces are connected to the clamping plate by the fasteners at positions laterally outward of the sliding gate housing portion to permit selective adjusting movement of the actuator housing relative to the sliding gate housing portion in both directions of travel of the valve handle to adjust the end limits of travel of the actuator to the end limits of travel of the valve handle corresponding to the slide gate open and closed positions.

* * * * *